(12) United States Patent
Bidner et al.

(10) Patent No.: US 9,984,567 B2
(45) Date of Patent: May 29, 2018

(54) DETECTION OF ONCOMING VEHICLES WITH IR LIGHT

(71) Applicant: Ford Global Technologies, LLC, Dearborn, MI (US)

(72) Inventors: David Karl Bidner, Livonia, MI (US); Timothy Joseph Clark, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/260,583

(22) Filed: Sep. 9, 2016

(65) Prior Publication Data

US 2018/0075741 A1     Mar. 15, 2018

(51) Int. Cl.
| | | |
|---|---|---|
| *G08G 1/16* | (2006.01) | |
| *G08G 1/04* | (2006.01) | |
| *G08G 1/056* | (2006.01) | |
| *G01S 17/93* | (2006.01) | |
| *G01S 17/02* | (2006.01) | |
| *G01S 13/93* | (2006.01) | |
| *G08C 23/04* | (2006.01) | |

(52) U.S. Cl.
CPC ............. *G08G 1/04* (2013.01); *G01S 13/931* (2013.01); *G01S 17/023* (2013.01); *G01S 17/936* (2013.01); *G08G 1/056* (2013.01); *G08G 1/162* (2013.01); *G08G 1/166* (2013.01); *G08C 23/04* (2013.01)

(58) Field of Classification Search
CPC .......... G08G 1/04; G08G 1/056; G08G 1/162; G08G 1/166; G01S 13/931; G01S 17/023; G01S 17/936; G08C 23/04
See application file for complete search history.

(56) References Cited

U.S. PATENT DOCUMENTS

| | | | |
|---|---|---|---|
| 5,717,390 A | 2/1998 | Hasselbring | |
| 7,012,551 B2 * | 3/2006 | Shaffer | B60R 1/00 315/82 |
| 7,460,951 B2 * | 12/2008 | Altan | G01S 13/726 340/903 |
| 8,098,171 B1 | 1/2012 | Szczerba et al. | |
| 8,164,543 B2 | 4/2012 | Seder et al. | |
| 2003/0001955 A1 * | 1/2003 | Holz | G01S 17/936 348/148 |

(Continued)

FOREIGN PATENT DOCUMENTS

| | | |
|---|---|---|
| JP | H02267048 A | 10/1990 |
| JP | H1116099 A | 1/1999 |
| WO | 2018005441 A2 | 1/2018 |

OTHER PUBLICATIONS

Search Report from United Kingdom Intellectual Property Office dated Feb. 28, 2018 regarding GB Application No. 1714302.5 (4 pages).

*Primary Examiner* — Sisay Yacob
(74) *Attorney, Agent, or Firm* — Frank A. MacKenzie; Bejin Bieneman PLC

(57) ABSTRACT

Infrared light is detected in a vehicle computer via an infrared sensor from a source outside the host vehicle. The computer can further determine that the infrared light was generated from a source in a second vehicle, detect the second vehicle based at least partly on the detected infrared light and possibly also partly on input from a host vehicle collision detection sensor.

18 Claims, 3 Drawing Sheets

(56) References Cited

U.S. PATENT DOCUMENTS

| | | | |
|---|---|---|---|
| 2003/0063477 A1* | 4/2003 | Stepanenko | B29C 45/14811 362/546 |
| 2004/0051659 A1* | 3/2004 | Garrison | G01S 13/931 342/70 |
| 2004/0114381 A1 | 6/2004 | Salmeen et al. | |
| 2005/0168151 A1* | 8/2005 | Shaffer | B60R 1/00 315/82 |
| 2007/0073473 A1* | 3/2007 | Altan | G01S 13/726 701/518 |
| 2011/0026008 A1* | 2/2011 | Gammenthaler | G01S 17/023 356/28 |
| 2011/0175755 A1* | 7/2011 | Yoshioka | G01S 3/8083 340/995.1 |
| 2013/0127638 A1 | 5/2013 | Harrison | |
| 2015/0088373 A1 | 3/2015 | Wilkins | |
| 2016/0229396 A1 | 8/2016 | Afrouzi | |

\* cited by examiner

DETECTION OF ONCOMING VEHICLES WITH IR LIGHT

BACKGROUND

An autonomous vehicle operates according to instructions from a computer controller, and without intervention of a user. The instructions of the computer controller are at least partially based on data provided by vehicle sensors. Thus, proper operation of vehicle sensors is critical for proper operation of the vehicle. For example, steering, acceleration, and braking of the autonomous vehicle each typically depend on data provided by one or more vehicle sensors, including data relating to other vehicles sharing a roadway with the autonomous vehicle. Thus, a vehicle sensor providing inaccurate or imprecise data about other vehicles can pose a serious risk to the autonomous vehicle.

DETAILED DESCRIPTION

Introduction

A host vehicle computer can detect infrared light, e.g., via an infrared sensor, originated from a source outside the host vehicle. For example, other vehicles proximate to the host vehicle, e.g., on a roadway with the host vehicle, may include infrared sensors and therefore be provided with infrared light emitters. Accordingly, the host vehicle computer is programmed to determine whether detected infrared light was generated from a source in another vehicle, i.e., an infrared light source mounted in or on the other vehicle. The vehicle computer is then programmed to identify the other vehicle based on the detected infrared light, typically in combination with data from one or more other sensors, e.g., received data from sensors such a radar and/or a camera.

System Elements

Figure 1:
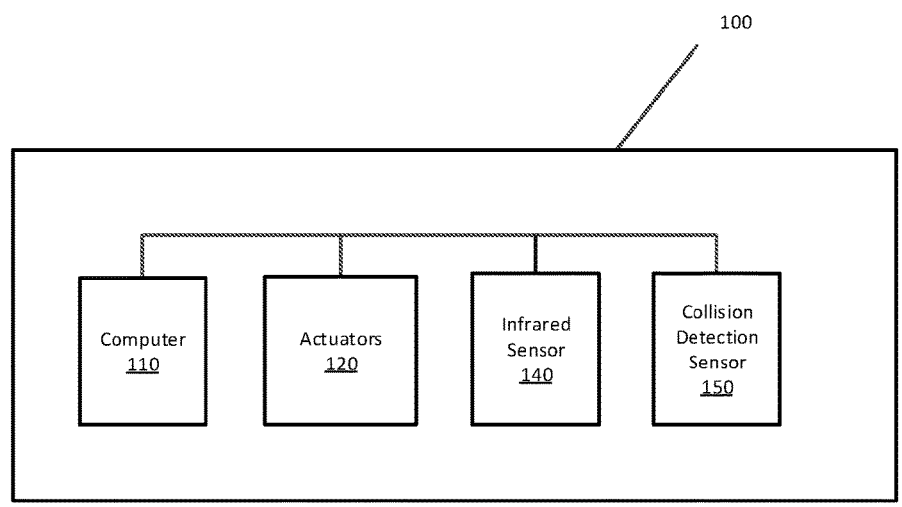
FIG. 1 is a block diagram of an exemplary detection system in a host vehicle.

FIG. 1 illustrates an example host vehicle 100 including a computer 110 that is programmed to detect infrared light via an infrared sensor 140, from a source outside the host vehicle 100. The vehicle 100 is referred to as a "host" vehicle for convenience; it may also be referred to as a "first" vehicle 100 in this disclosure. The computer 110 can further determine that the infrared light was generated from a source in a second vehicle, detect the second vehicle based at least partly on the detected infrared light and possibly also partly on input from a collision detection sensor 150.

The vehicle 100 may be powered in variety of known ways, e.g., with an electric motor and/or internal combustion engine. The vehicle 100 includes the computer 110, sensors such as the collision detection sensor 150, an infrared sensor 140, etc., actuators 120, and other components discussed herein below.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., the actuators 120, the infrared sensor 140, the collision detection sensor 150, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

As already mentioned, generally included in instructions stored in the memory and executed by the computer 110 is programming for operating one or more vehicle components, e.g., braking, steering, propulsion, etc., without intervention of a human operator. Using data received in the computer 110 from sensors such as the infrared sensor 140 and the collision detection sensor 150, the computer 110 may make various determinations and/or control various vehicle components and/or operations without a driver to operate the vehicle. For example, the computer 110 may include programming to regulate vehicle operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location, intersection (without signal) minimum time-to-arrival to cross the intersection, etc.

The vehicle 100 may include one or more infrared sensors 140. An infrared sensor 140 is an electronic sensor such as is known that measures infrared light radiating from objects in a field of view. The data may be received by the computer 110 in a known manner. The infrared sensors 140 may be mounted in various locations in the vehicle 100, e.g., in a front or rear vehicle light enclosure, behind the windshield, in the side view mirror packages, etc.

The vehicle 100 may include one or more infrared light emitters 160 such as are known. The infrared light emitters 160 of the vehicle 100 may be detectable by the infrared sensors 140 of other vehicles 100. An infrared light emitter 160 may include one or more infrared Light Emitting Diode (LED), e.g., mounted inside the vehicle 100, in headlight or taillight enclosures of the vehicle 100, etc. Additionally or alternatively, the light bulbs included in the light enclosures of the vehicle 100 may include radiations in infrared light spectrum, i.e., the light bulbs may not only radiate visible light to illuminate an area exterior to the vehicle 100 but also radiate infrared light.

The collision detection sensor(s) 150 may include various types of known sensors such as cameras, radars, or Light Detection and Ranging (LIDAR) sensors disposed in the vehicle 100 providing data encompassing at least some of the vehicle exterior. The data may be received by the computer 110 from sensors 150 in a known manner, e.g., via a vehicle 100 network. Sensor 150 data may include coordinates, e.g., in a 3-dimensional coordinate system maintained by the vehicle 100 computer 110, of one or more objects relative to the host vehicle 100. The data may further include other data pertaining to other objects such as size, relative speed to the host vehicle 100, etc. As explained further below, the data may include imprecision and/or error, e.g., coordinates or other attributes included in the data may be inaccurate. Inaccuracy may be caused by environmental conditions such as inclement weather, e.g., rain or fog weather may impair detection capabilities of a camera collision detection sensor 150.

The actuators 120 are implemented via circuits, chips, or other electronic components that can actuate various vehicle subsystems in accordance with appropriate control signals as is known. For instance, the actuators 120 may be implemented via one or more relays, servomotors, etc. The actuators 120, therefore, may be used to control braking, acceleration, and steering of the host vehicle 100. The control signals used to control the actuators 120 may be generated by the computer 110, a control unit located in the vehicle 100, e.g., the brake controller, etc.

Figure 2:
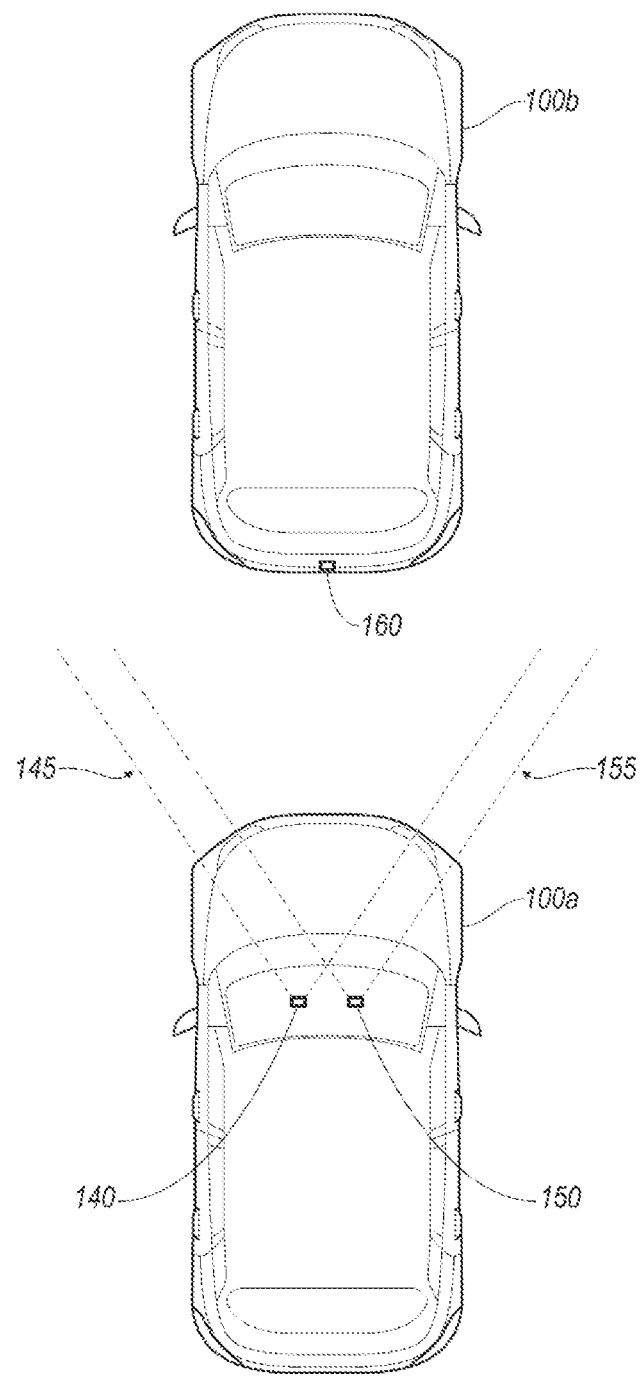
FIG. 2 is a diagram showing the host vehicle of FIG. 1 and second vehicle with an infrared light source.

FIG. 2 illustrates two vehicles 100, i.e., a first (or host) vehicle 100A with an infrared sensor 140 and a collision detection sensor 150 such as a radar mounted to, e.g., a front windshield of the first vehicle 100A. A second vehicle 100B includes an infrared light emitter 160, e.g., mounted to an exterior surface of the second vehicle 100B. As discussed below, the first vehicle 100A computer 110 may be programmed to identify the infrared light emitter 160 in the second vehicle 100B, i.e., to determine that infrared light is detected from a second vehicle 100B. Further, the computer 110 may be programmed to detect the second vehicle 100B based partly on data received from the first vehicle 100A infrared sensor 140 and based partly on data received from the collision detection sensor 150.

Fields of view 155, 145 of the first vehicle 100A collision detection sensor 150 and the infrared sensor 140, respectively, may partially or fully overlap, as shown in FIG. 2. Additionally, the first vehicle 100A may include multiple collision detection sensors 150 and/or multiple infrared sensors 140.

The infrared light emitter(s) 160 may be mounted to an exterior surface of the second vehicle 100B. In one example, as shown in FIG. 2, the infrared light emitter(s) 160 can be mounted to a front exterior surface of the vehicle 100B, e.g., mounted inside headlight enclosures. For example, when vehicles 100A, 100B are approaching one another, e.g., in oncoming directions with respect to one another, the second vehicle 100B infrared light emitter 160 may be in field of views 145, 155 of the first vehicle 100A collision detection sensor 150 and the infrared sensor 140. Additionally or alternatively, multiple infrared light emitters 160 can be mounted to various exterior surfaces of the vehicle 100B, e.g., front and rear sides of the vehicle 100B.

The first vehicle 100A computer 110 may be programmed to detect infrared light from an infrared source such as the second vehicle 100B infrared light emitter 160 based on data received from the first vehicle 100A infrared sensor 140. The computer 110 may be further programmed to determine that the infrared source is in a second vehicle 100B, i.e., the computer 110 can be programmed, e.g., as described in the following paragraphs, to distinguish an infrared source in a second vehicle 100B from, e.g., an infrared source mounted to a traffic light, a building, etc.

In one example, to determine that the infrared source is in the second vehicle 100B, the first vehicle 100A computer 110 may be programmed to determine coordinates of the infrared source relative to the first vehicle 100A. In this example, the computer 110 may further calculate a speed vector of the infrared source based on of changes in the infrared source coordinates over time. The speed vector may include a scalar speed quantity and a direction of the detected infrared source movement, e.g., a three dimensional vector. The computer 110 may determine that the infrared source is in a second vehicle 100B, e.g., the infrared light emitter 160, in the vehicle 100B. Such determination can be made in the host vehicle 100A computer 110 by comparing the infrared source speed vector to a speed vector of the first vehicle 100A and thereby determining movement of the infrared source coordinates relative to the first vehicle 100A coordinates, e.g., received via a GPS sensor of the first vehicle 100A. An infrared source moving relative to the first vehicle 100A with a speed vector different than the first vehicle 100A may be attached to a moving object, e.g., the second vehicle 100B.

In another example, the first vehicle 100A computer 110 may determine that an infrared source is in a second vehicle 100B based on changes of in an intensity of infrared light received by the infrared sensor 140. There may be various infrared light sources proximate, but external, to a second vehicle 100B, and radiations of such infrared sources can be reflected by an exterior surface of the second vehicle 100B. The reflections of such infrared radiations may be received by the first vehicle 100A infrared sensor 140. A reflection of infrared light on an exterior surface depends on a reflection angle between the second vehicle 100B exterior surface and a direction of radiation received from the infrared source. Upon changes of the reflection angle due to, e.g., movement of one or both of the vehicles 100A, 100B, an intensity of the infrared light received at the first vehicle 100A infrared sensor 140 may change, i.e., fluctuate. Fluctuation in the received infrared light intensity may indicate that the infrared light is not originated from the coordinate of the infrared light. In other words, the coordinates of the detected infrared source may indicate coordinates of a reflection surface on a second vehicle 100B rather than coordinates of an infrared source in the second vehicle 100B.

In another example, the first vehicle 100A computer 110 may determine that an infrared source is located in a second vehicle 100B based on data received from the infrared sensor 140 and the collision detection sensor 150. The computer 110 may calculate the infrared source coordinates based on the data received from the infrared sensor 140. The computer 110 may further calculate object coordinates based on data received from the collision detection sensor 150. The computer 110 can then determine whether an infrared source is in a second vehicle 100B based on the calculated infrared source coordinates and the calculated object coordinates.

Further, the computer 110 may calculate the coordinates of the second vehicle 100B boundaries, e.g., coordinates of the vehicle body corners, of the second vehicle 100B. Then, the computer 110 may determine whether the detected infrared source is in the second vehicle 100B by determining whether the coordinates of the infrared source are disposed within the second vehicle 100B boundaries. As one example, the computer 110 may use known image processing techniques to associate a virtual rectangle representing the boundaries of the second vehicle 100B viewed via the field of view 155. When the coordinates of the detected infrared source are disposed within the virtual rectangle, then the computer 110 may determine that the infrared source is in the second vehicle 100B. The computer 110 may further be programmed to determine that the coordinates of the infrared source are immobile relative to the virtual rectangle, e.g., relative to the corners of the virtual rectangle.

In yet another example, the computer 110 may compare the coordinates of the infrared source to the coordinates of other objects calculated based on data received from radar. The computer 110 may further determine that the infrared source moves relative to other objects proximate to the vehicle, e.g., buildings, traffic lights, etc. The computer 110 may determine that an infrared source which moves relative to other objects surrounding the infrared source, is a moving object, e.g., a second vehicle 100B.

As discussed above, data reported by the collision detection sensors 150 may have inaccuracies, e.g., caused by low light conditions, inclement weather conditions, or certain traffic conditions such as a lane change, of a second vehicle 100B. Such inaccuracies may include incorrect coordinates of objects or low confidence in detection of the object. Based on collision detection sensor 150 data, the computer 110 may be programmed to associate a detected object, e.g., a second vehicle 100B, with a confidence level that may be determined in a known manner for assessing confidence in sensor data. A confidence level may indicate an estimated probability of proper detection of an object, i.e., likelihood of an object being present with the determined characteristics, e.g., location of the detected object, determined by the computer 110 program. A confidence level may be identified with a percentage number or a discrete set of levels such as "low", "medium", and "high." A lower percentage or a "low" level associated with a detected object may indicate lower likelihood of proper detection. A confidence level of a detected object may govern how vehicle subsystems are controlled based on data from the collision detection sensors 150. For example, a brake subsystem may not be actuated based on an object detected with a confidence level below a predetermined confidence level threshold such as 50% or "medium". As discussed below, the first vehicle 100A computer 110 may detect the second vehicle 100B based on data from the collision detection sensor 150 in combination with data from the infrared sensor 140. Such a detection may be beneficial by having higher accuracy, e.g., avoiding low confidence detection of objects.

In order to detect the second vehicle 100B, the first vehicle 100A computer 110 may receive the infrared coordinates based on data from the infrared sensor 140 and object data based on data from the collision detection sensor 150. The computer 110 may further receive data such as speed or acceleration data from the first vehicle 100A sensors. In the following paragraphs, various examples of combining data from infrared sensor 140 and the collision detection sensor 150 to detect the second vehicle 100B are discussed.

In one example, the first vehicle 100A computer 110 may calculate a first trajectory of the infrared light coordinates relative to the first vehicle, calculate a second trajectory of the object coordinates, and detect the second vehicle based on the first trajectory combined with the second trajectory. To detect the second vehicle 100B, the computer 110 may further receive data such as speed and acceleration of the first vehicle 100A from the first vehicle 100A sensors including sensors 140, 150 as well as other known sensors of controllers such as an engine controller, a speed sensor, an acceleration sensor, etc.

The first and second trajectories may refer to movement paths of the infrared source and the objects respectively, e.g., a polynomial of third degree such as $Y=aX+bX^2+cX^3$. In this example polynomial, Y and X represent longitudinal and lateral coordinates. Parameters a, b, and c of such a polynomial may determine a lane curvature for the lane, in which the respected cluster of vehicles travel, as is known.

The computer 110 may detect the second vehicle 100B based on a first trajectory of an infrared light source and a second trajectory of an object. For example, the computer 110 may determine that first and second trajectories correspond to a same object when the first and the second trajectories substantially match. As one example, with respect to the polynomial explained above, substantially matching may mean, for any given X position along the respective trajectories, a difference between Y values of the first and the second trajectory is below a predetermined threshold such as 2 meters. Based on such determination that the first trajectory of the infrared light source and the second trajectory of the object substantially match, the computer 110 may associate the infrared light source to the object, e.g., the second vehicle 100B. Such association may increase an accuracy of determining the coordinates of the second vehicles 100B based on combined infrared data the object data.

In another example, the computer 110 may be programmed to modify a confidence level of detecting the second vehicle 100B based on the infrared sensor 140 data. The computer 110 may be programmed to, e.g., increase the confidence level of a detected object based on the infrared sensor 140 data. As an example, during a lateral acceleration of the second vehicle 100B or inclement weather, the first vehicle 100A computer 110 may reduce confidence level associated with the second vehicle 100B. In such conditions, a confidence level associated with an object may be below a predetermined confidence level, e.g., 50%, which may mean that the object detection data may be unsuitable for governing the first vehicle 100A operation. However, the computer 110 may be programmed to maintain a high confidence level by tracking the infrared source in the second vehicle 100B. In other words, during, e.g., inclement weather, the computer 110 may use infrared source in the second vehicle 100B as to reach a higher confidence level in detecting the second vehicle 100B e.g., a confidence level higher than the predetermined confidence level of 50%.

Exemplary Process Flow

Figure 3:
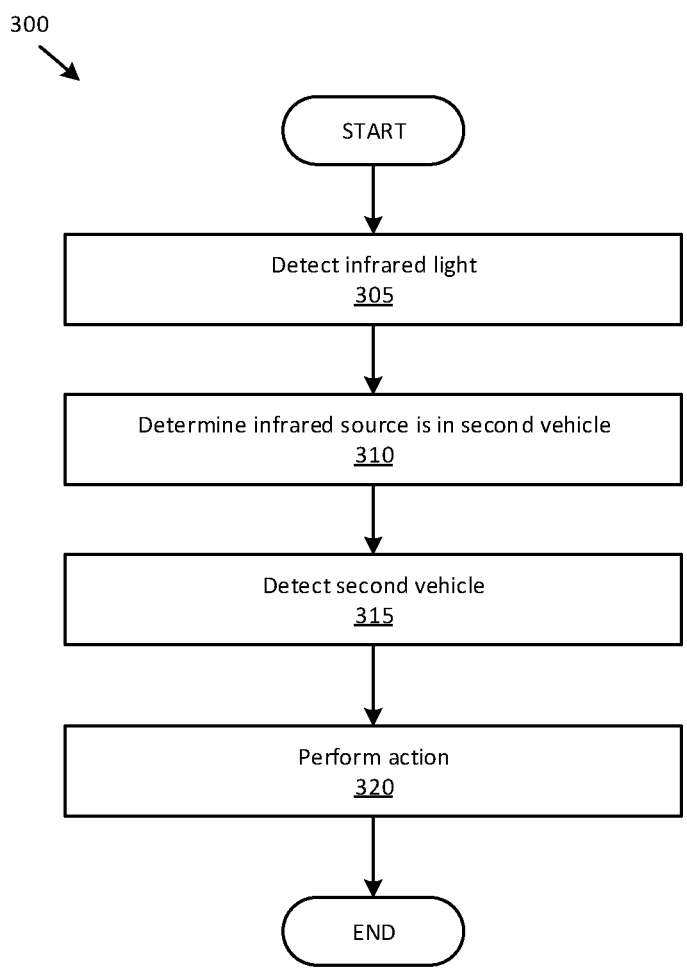
FIG. 3 is a flowchart of an exemplary process for a host vehicle detecting a second vehicle.

FIG. 3 illustrates an example process 300 for a first (or host) vehicle 100A computer 110 detecting a second vehicle 100B based on data received from the first vehicle 100A infrared sensor 140 and collision detection sensor 150. The first vehicle 100A computer 110 may be programmed in accordance with the example process 300.

The process 300 begins in a block 305, in which the computer 110 detects infrared light in an area outside the first vehicle 100A. The computer 110 may receive data from one or more infrared sensors 140 mounted in the first vehicle 100 with field of view(s) encompassing an area outside the first vehicle 100A.

Next, in a block 310, the computer 110 determines that the infrared light was generated from a source in another vehicle, e.g., the second vehicle 100B. As discussed above, the computer 110 may use various techniques to make such determination. For example, the computer 110 may detect that the infrared light source is moving relative to infrastructure features such as buildings, traffic lights, etc., based on data received from the first vehicle 100A collision detection sensor 150. As another example, the computer 110 can determine that the infrared light was generated from a source in the second vehicle 100B at least in part by using techniques such as are known for determining coordinates of the infrared light relative to the first vehicle 100A. In another example, such determination can be made at least in part by calculating a boundary of the second vehicle 100B based on data received from the first vehicle 100A collision detection sensor 150 and determining that the coordinates of the infrared light are located within the boundary of the second vehicle 100B that can be predicted as described above. In yet another example, the computer 110 determines that the infrared light was generated from a source in the second vehicle 100B at least partially based on a speed of the first vehicle 100A, a direction of travel of the first vehicle 100A, and a movement of the detected infrared light relative to the first vehicle 100A.

Next, in a block 315, the computer 110 detect another vehicle, e.g., the second vehicle 100B, based partly on the detected infrared light and partly on input from the first vehicle 100A collision detection sensor 150. As discussed above, the computer 110 may use various techniques to make such determination. For example, the computer 110 may detect the second vehicle 100B based at least partly on receiving the infrared light coordinates and receiving object data including object coordinates from the collision detection sensor. Further, the computer 110 calculates a first trajectory based on the infrared light coordinates and a second trajectory based on the object data. The computer 110 then detects the second vehicle based at least partly on the first trajectory and the second trajectory.

Next, in a block 320, the computer 110 performs an action in accordance with the detected objects data of the block 315 and/or detected infrared source in the second vehicle 100B of the block 310. For example, the computer 110 may output a signal, e.g., a brake pressure value 100 psi, via the vehicle communication network to a brake actuator 120.

Following the block 320, the process 300 may end or return to the block 305.

Computing devices such as those discussed herein generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, C#, Visual Basic, Python, Java Script, Perl, HTML, PHP, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor and a memory, the memory storing instructions executable by the processor such that the computer is programmed to:
   detect infrared light, in a first vehicle, from outside the first vehicle;
   determine that the infrared light was generated from a source in a second vehicle based at least partially on a speed of the first vehicle, direction of the first vehicle, and movement of the detected infrared light relative to the first vehicle; and
   detect the second vehicle based partly on the detected infrared light and partly on data from a collision detection non-infrared sensor of the first vehicle.

2. The computer of claim 1, wherein the computer is further programmed to determine that the infrared light was generated from the source in the second vehicle at least in part by determining coordinates of the infrared light relative to the first vehicle.

3. The computer of claim 2, wherein the computer is further programmed to determine that the infrared light was generated from the source in the second vehicle at least in part by:
   calculating a boundary of the second vehicle based on data received from the collision detection non-infrared sensor of the first vehicle; and determining whether the coordinates of the infrared light are disposed within the boundary of the second vehicle.

4. The computer of claim 1, wherein the computer is further programmed to detect the second vehicle at least in part by:
receiving coordinates of the infrared light; and
receiving object data including object coordinates from the collision detection non-infrared sensor of the first vehicle.

5. The computer of claim 4, wherein the computer is further programmed to detect the second vehicle at least in part by:
calculating a first trajectory of the infrared light coordinates relative to the first vehicle;
calculating a second trajectory of the object coordinates; and
detecting the second vehicle based at least partially on the first trajectory and the second trajectory.

6. The computer of claim 1, wherein the source in the second vehicle is mounted to an exterior surface of the second vehicle.

7. The computer of claim 1, wherein the collision detection non-infrared sensor of the first vehicle is a radar.

8. The computer of claim 1, wherein the first vehicle includes an infrared sensor having a first field of view overlapping with a second field of view of the collision detection non-infrared sensor of the first vehicle.

9. The computer of claim 1, further programmed to detect the second vehicle in an oncoming direction.

10. A method, comprising:
detecting infrared light, in a first vehicle, from outside the first vehicle;
determining that the infrared light was generated from a source in a second vehicle based at least partially on a speed of the first vehicle, a direction of the first vehicle, and movement of the detected infrared light relative to the first vehicle; and
detecting the second vehicle based partly on detected infrared light and partly on data from a collision detection non-infrared sensor of the first vehicle.

11. The method of claim 10, wherein determining that the infrared light was generated from the source in the second vehicle further includes determining coordinates of the infrared light relative to the first vehicle.

12. The method of claim 10, wherein determining that the infrared light was generated from the source in the second vehicle further includes:
calculating a boundary of the second vehicle based on data received from the collision detection non-infrared sensor of the first vehicle; and
determining whether the coordinates of the infrared light are disposed within the boundary of the second vehicle.

13. The method of claim 10, wherein detecting the second vehicle further includes:
receiving coordinates of the infrared light; and
receiving object data including object coordinates from the collision detection non-infrared sensor of the first vehicle.

14. The method of claim 10, wherein detecting the second vehicle further includes:
calculating a first trajectory of the infrared light coordinates relative to the first vehicle;
calculating a second trajectory of the object coordinates; and
detecting the second vehicle based at least partially on the first trajectory and the second trajectory.

15. The method of claim 10, wherein the source in the second vehicle is mounted to an exterior surface of the second vehicle.

16. The method of claim 10, wherein the collision detection non-infrared sensor of the first vehicle is a radar.

17. The method of claim 10, wherein the first vehicle includes an infrared sensor having a first field of view overlapping with a second field of view of the collision detection non-infrared sensor of the first vehicle.

18. The method of claim 10, wherein detecting the second vehicle further includes detecting the second vehicle in an oncoming direction.

* * * * *